United States Patent [19]

Babendererde et al.

[11] Patent Number: 4,687,374

[45] Date of Patent: Aug. 18, 1987

[54] METHOD OF AND APPARATUS FOR CONCRETE TUNNEL LINING

[75] Inventors: Siegmund Babendererde, Bad Vilbel; Bernd Hillemeier, Wiesbaden; Otto Braach, Hattingen, all of Fed. Rep. of Germany

[73] Assignee: Hochtief Aktiengesellschaft Vorm. Greb. Helfmann, Essen, Fed. Rep. of Germany

[21] Appl. No.: 839,791

[22] Filed: Mar. 13, 1986

[30] Foreign Application Priority Data

Mar. 13, 1985 [DE] Fed. Rep. of Germany ....... 3508966

[51] Int. Cl.$^4$ ......................... E21D 9/06; E21D 11/10
[52] U.S. Cl. ................................... 405/146; 405/150; 264/25
[58] Field of Search ......................... 405/141, 146, 150; 219/10.55 R, 10.55 A, 10.55 M; 264/25, 31, 33; 404/95; 299/31, 33

[56] References Cited

U.S. PATENT DOCUMENTS

| 3,449,213 | 6/1969 | Knapp et al. | 264/25 |
| 3,452,176 | 6/1969 | Levinson | 264/25 |
| 3,594,530 | 7/1971 | Wiegman | 219/10.55 A |
| 3,827,244 | 8/1974 | Walbröhl | 405/141 |
| 4,018,642 | 4/1977 | Pike et al. | 219/10.55 A X |
| 4,222,681 | 9/1980 | Khodosh et al. | 405/141 |
| 4,259,560 | 3/1981 | Rhodes | 219/10.55 A X |
| 4,319,856 | 3/1982 | Jeppson | 219/10.55 A X |

FOREIGN PATENT DOCUMENTS

| 2703536 | 1/1977 | Fed. Rep. of Germany . | |
| 315709 | 11/1971 | U.S.S.R. | 264/25 |
| 527407 | 6/1977 | U.S.S.R. | 264/25 |

Primary Examiner—Cornelius J. Husar
Assistant Examiner—Nancy J. Stodola
Attorney, Agent, or Firm—Karl F. Ross; Herbert Dubno

[57] ABSTRACT

An apparatus for making a tunnel lining from concrete in a single operation with a tunnel excavator comprises a tunnel lining form consisting of a plurality of tunnel lining form segments and a form front adjacent the tunnel excavator and a tunnel lining circular space between the form and the ground. In order to heat the concrete as it is pumped into the tunnel lining circular space to accelerate hardening, transmitting antennae for electromagnetic radiation are mounted in the tunnel lining form segments and/or the feed pipes for the concrete. Similarly a process for making a tunnel lining from concrete comprises pumping concrete into the tunnel lining circular space and accelerating the hardening of the concrete by heating it with electromagnetic radiation. The tunnel form is rapidly repositioned after the concrete being hardened reaches a sufficient strength.

6 Claims, 3 Drawing Figures

METHOD OF AND APPARATUS FOR CONCRETE TUNNEL LINING

CROSS REFERENCE TO RELATED APPLICATIONS

The application is related to the commonly owned copending applications:

| Ser. No. | filed |
|---|---|
| 697,786 | 4 February 1985 |
| 717,824 | 29 March 1985 |
| 726,585 | 23 April 1985 |
| 690,163 | 10 January 1985 |
| 674,895 | 26 November 1984 |
| 673,775 | 21 November 1984 | and U.S. Pat. No. 4,568,202 issued Feb. 4, 1986 on Ser. No. 713,462 filed Mar. 19, 1985, and the citations contained therein.

FIELD OF THE INVENTION

Our present invention relates to a method of making a concrete tunnel lining in a single tunnel excavating operation with a tunnel excavator, for example a shield tunnel excavator. Our invention also relates to an apparatus for carrying out the process.

BACKGROUND OF THE INVENTION

It is known to produce a concrete tunnel lining with the aid of a tunnel form comprising a plurality of tunnel form segments around which a circular space is provided, which is closed by a form front at its front end next to the tunnel excavator and at its opposing rear end by the hardened or progressively hardening concrete of the tunnel lining.

Into the tunnel lining circular space, concrete is pumped as the form front advances.

The tunnel form segments are repositioned following the progressing tunnel excavator after hardening of the concrete. Upon removal of a segment the strength of the freshly formed concrete should be such that the concrete can already stand alone and withstand the weight of the surrounding structure without the removed form.

The strength of the freshly formed concrete and its setting rate is however dependent on the composition of the concrete and can be adjusted with suitable additives.

In any case after hardening of the concrete to an adequate strength the tunnel form can be repositioned. This hardening usually requires many hours. Generally the hardening spreads from the rear end of the tunnel lining circular space into the concrete which is pumped in at a later time.

The form elements or rings constituted of the tunnel form segments are repositioned starting with the rearmost section to follow the progressing tunnel excavator.

In practice a tunnel form of 20 to 50 m in length must always remain. Because of this length, necessary to ensure that a self-supporting lining of concrete is formed, a sliding form cannot be used. Attempts to use sliding forms in constructing a concrete tunnel lining have failed for the most part.

A heating treatment for promoting the hardening of concrete to a sufficient strength is already known. These known treatments however have not been successful with tunnel lining. In one known process for making a tunnel lining according to German Open patent application DE-OS No. 27 03 536 only the region near the form is heated. The heat is supplied to the concrete by comparatively slow conduction through the metal shell. Also the hardening occurs from the form side to the interior of the concrete which is disadvantageous.

OBJECTS OF THE INVENTION

It is an object of our invention to provide an improved process for making a concrete tunnel lining whereby prior art drawbacks can be obviated.

It is also an object of our invention to provide an improved apparatus for making a concrete tunnel lining.

It is also another object of our invention to provide an improved process and apparatus for making a concrete tunnel lining which permits a shorter length tunnel form than earlier systems.

It is yet another object of our invention to provide an improved process and apparatus for making a concrete tunnel lining in which the tunnel form members can be quickly repositioned or a continuous form can be used.

It is still another object of our invention to provide an improved process and apparatus for making a concrete tunnel lining in which the concrete in the circular space for the tunnel lining is hardened much more quickly to a sufficient strength.

SUMMARY OF THE INVENTION

These objects and others which will become more readily apparent hereinafter are attained in accordance with our invention in a process for making a tunnel lining from concrete in a single operation with a tunnel excavator.

The tunnel lining circular space is provided with the help of a tunnel form consisting of a plurality of tunnel form segments, and the tunnel lining circular space is closed by a form front at a front end adjacent the tunnel excavator and at a rear end of the tunnel form by already hardened concrete.

The proces comprises pumping in the concrete in fluid form through the form front, accelerating the hardening of the concrete by electromagnetic wave heating and repositioning the tunnel form segments following the tunnel excavator after hardening the concrete to a sufficient strength.

The above and other objects are also attained in an apparatus for making a concrete tunnel lining in a single operation with a tunnel excavator comprising a tunnel lining form consisting of a plurality of tunnel lining form segments connected to and following the tunnel excavator and a form front adjacent the tunnel excavator and a tunnel lining circular space between the form and the ground.

According to the process of our invention the concrete being conducted into the tunnel lining circular space and/or in the tunnel lining circular space is heated dielectrically with electromagnetic radiation. The heating of a dielectric material that occurs by application of an electromagnetic field is well-known. Microwave heaters and ovens are designed to utilize that effect. The penetration depth of an electromagnetic wave depends on its frequency and intensity.

Our invention is based on the observation that concrete is a dielectric of sufficient strength for dielectric heating as long as metal reinforcements or fiber reinforcements of metal fiber do not prevent the penetration of the electromagnetic radiation.

In the tunnel building process of the invention the tunnel lining circular space and thus the concrete contain no such reinforcements.

It is understood that the region through which the electromagnetic radiation must penetrate or pass cannot be covered by metal, since the electromagnetic radiation cannot penetrate the metal. However metallic components can be used in the system which transmits the electromagnetic radiation as is explained further below.

In particular there are several possible variants of the process according to our invention. The electromagnetic radiation can be introduced into the concrete from the tunnel form. It is not necessary that the electromagnetic waves operate until the desired strength or hardness is reached. It is sufficient that a suitably uniform heating of the concrete occurs. The heating accelerates the chemical process of hardening, i.e. promotes the earlier attainment of the so-called early-hardening-strength.

The concrete flowing into the tunnel lining circular space via the input pipe can also be subjected to a dielectric heating. This can be done adjacent the form front.

The wavelength of the electromagnetic waves is continually adjusted so that the concrete in a feed pipe is heated dielectrically in bulk through the entire diameter of the feed pipe. Also the intensity of the electromagnetic radiation may be suitably adjusted. The wavelength of the electromagnetic radiation can be changed to vary the depth of penetration of the radiation.

Particularly when the electromagnetic radiation from the tunnel form is introduced into concrete, we are able to effect a penetration which is so deep that a dielectric heating occurs even into the surrounding ground sc that the heating of the concrete is very uniform. Consequently a very uniform hardening occurs.

Generally it is sufficient to tune the system so that the electromagnetic waves penetrate only into a region in the concrete close to or connected to the form front and heat the layer over its full thickness or only a part of it. Specifically a heating of from 0.5 to 5 minutes is sufficient.

Advantageously in another embodiment the heating proceeds long enough so that an early hardening strength of 30 kp/cm$^2$ results. In pumping concrete with an aggregate commonly used for a tunnel lining, electromagnetic wave frequencies of 20 to 40 Mhz can be used effectively. Furthermore a concrete with an electromagnetic additive which influences the strength or hardness can be subjected to dielectric heating in a tunnel form according to our invention.

In the apparatus according to our invention inductive and/or capacitative transmitting antennae for the electromagnetic radiation are built in, preferably into or on the tunnel form segments. Transmitting antennae adjacent each other are appropriately driven counterphasally (i.e. electrically 180° out-of-phase).

Another apparatus for performing the process has at least one feed pipe for concrete having inductive and/or capacitative transmitting antennae. The feed pipe can comprise a dielectric material, for example a ceramic, so that the transmitting antennae can be mounted exteriorly.

Our invention reduces significantly the required time to attain a sufficient hardness, i.e. increases the early hardness strength for example by half or more. This allows a corresponding reduction of the length of the tunnel form which remains behind the excavating machine and makes significantly easier the steps necessary to reposition the tunnel form. The tunnel form can advantageously comprise a plurality of tunnel form segments which are individually repositionable. Because of the short form, a sliding form can be used which does not require removal or repositioning of the form sections.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
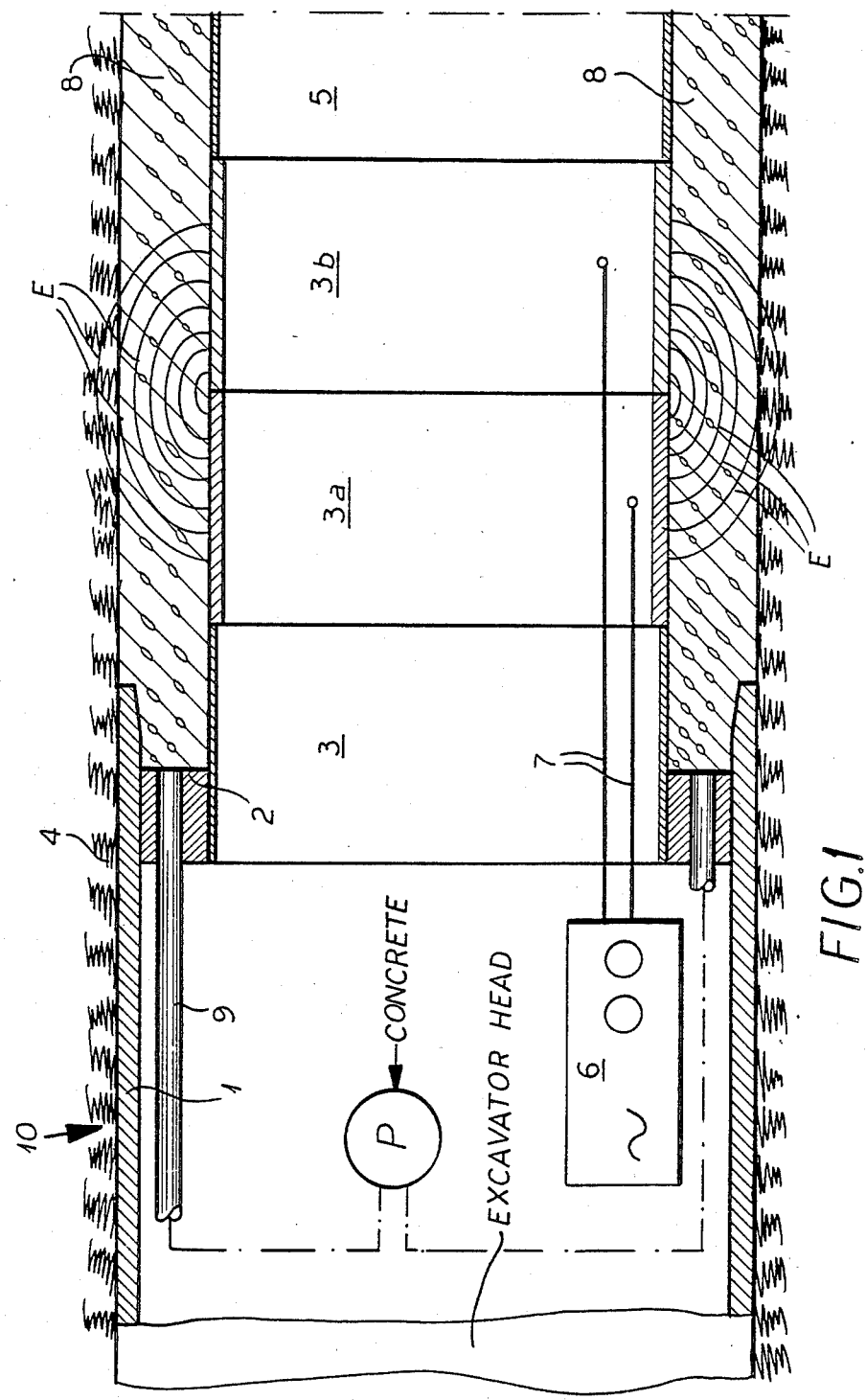
FIG. 1 is a longitudinal cross sectional view of an apparatus for making a concrete tunnel lining according to our invention.
Figure 2:
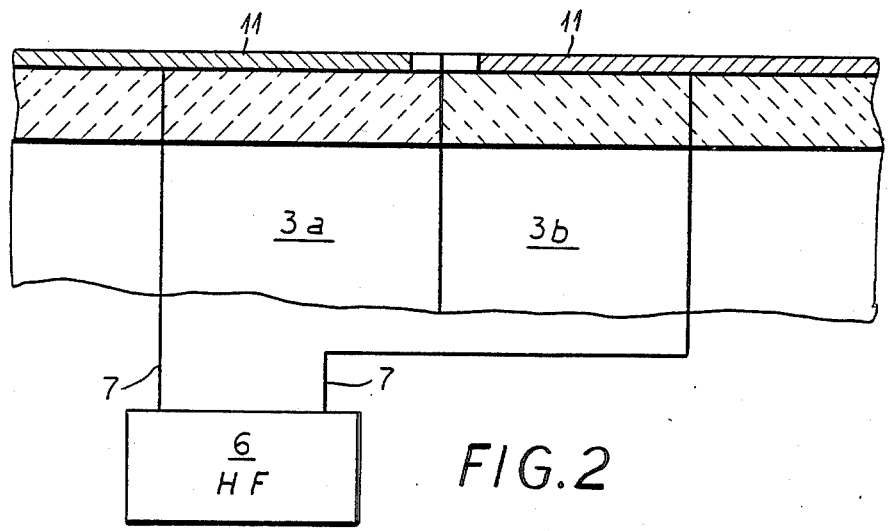
FIG. 2 is a detail of the wall of the heating region.
Figure 3:
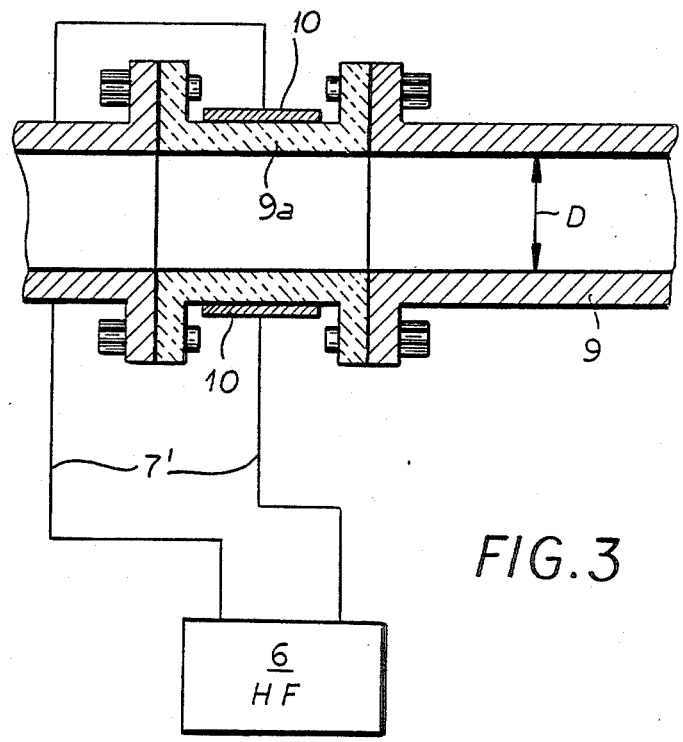
FIG. 3 is a section through the concrete feed pipe.

We have shown a shield extension 1 of a tunnel excavator (see the aforementioned application), and a form front 2 connected with a tunnel form consisting of a plurality of tunnel form segments 3, 3a, and 3b. One also sees the tunnel casing 5 in the surrounding subterranean structure 4.

The tunnel form segments of ceramic 3a and 3b have integrated antennae 11. They are driven electrically in phase opposition by a transmitter 6 having an output in the 20 to 40 MHz range. They are connected to transmitter 6 of course by the shielded cables 7.

The concret 8 is pumped into the tunnel lining circular space 12 between tunnel form 3 and the ground 4 to form the tunnel lining 15. The feed pipe 9 having a diameter D serves for delivery of the concrete 8 behind form front 2. When the transmitter 6 is switched on, an electromagnetic field arises having high frequency electric field lines E and a corresponding alternative magnetic field, which penetrates into the concrete 8 of the tunnel lining 15 and if the power and frequency are so adjusted, also a little way into the surrounding ground 4. As a result the concrete 8 and the surrounding ground 4 are heated dielectrically and the hardening of the concrete 8 is considerably accelarated. The form can be moved when the heating results in a strength of 30 kp/cm$^2$. The dielectric heating of the concrete 8 can be commenced when it is still in part of the feed pipe 9 using one or more transmitting antennas 10 connected to transmitter 6 by cable 7' and mounted on a ceramic segment 9a of the pipe.

We claim:

1. A process for making a tunnel lining from concrete in a single operation with a tunnel escavator, a tunnel lining circular space being provided with the help of a tunnel form consisting of a plurality of tunnel form segments, said tunnel lining circular space being closed by a form front end adjacent said tunnel excavator and at a rear end of said tunnel form by said concrete which has already hardened, said process comprising:
   (a) pumping said concrete into said space in fluid form through a pipe through said form front,
   (b) accelerating the hardening of said concrete by heating it as it passes through a section of said pipe before it enters said space dielectrically with electromgnetic radiation, and (c) repositioning said tunnel form segments following said tunnel excavator after hardening of said concrete to a strength which is sufficient.

2. The process defined in claim 1 wherein the wavelength of said electromagnetic radiation is such that said concrete in said pipe section is heated dielectrically in bulk throughout the entire diameter of said pipe section.

3. The process defined in claim 2 wherein said electromagnetic radiation has a frequency of from 20 to 40 MHz.

4. The process defined in claim 3 wherein said concrete contains additives influencing the early hardening strength thereof.

5. An apparatus for making a tunnel in a subterranean structure, comprising:
- a tunnel excavator adapted to be advanced through said subterranean structure to form a tunnel having a tunnel wall;
- at least one tunnel-lining form adapted to be disposed in said tunnel behind said excavator to define an annular space with said wall, said excavator being provided with a form front which is advanced with the excavator;
- means including a pipe opening through said form front for pumping concrete into said space, whereby upon hardening the concrete forms a lining for said wall;
- a transmitting antenna on said pipe for electromagnetic irradiation and heating of said concrete before it enters said space; and
- means for electrically energizing said antenna.

6. The apparatus defined in claim 5 wherein two diametrically opposite antennae are provided on said pipe, and said means for electrically energizing is connected to said antennae for energizing them with electrical signals which are out of phase by 180° C.

* * * * *